United States Patent [19]

Totani

[11] Patent Number: 5,603,056

[45] Date of Patent: Feb. 11, 1997

[54] DISK DRIVE CONTROL COMPUTER AND METHOD FOR REWRITING CONTROL PROGRAM IN FLASH EEPROM WITH SERIAL COMMUNICATION USING UNASSIGNED PINS OF SCSI OR ATA CONNECTOR

[75] Inventor: Tokuyuki Totani, Tokyo, Japan

[73] Assignee: Kabushiki Kaisha Toshiba, Kawasaki, Japan

[21] Appl. No.: 302,014

[22] Filed: Sep. 9, 1994

[30] Foreign Application Priority Data

Sep. 13, 1993 [JP] Japan ................................ 5-227425

[51] Int. Cl.⁶ .............................. G06F 9/06; G06F 9/24
[52] U.S. Cl. ........................ 395/828; 395/681; 395/430
[58] Field of Search ............................. 395/700, 750, 395/828, 430

[56] References Cited

U.S. PATENT DOCUMENTS 4,430,727  2/1984  Moore et al. ............................ 395/442
5,388,267  2/1995  Chan et al. ............................. 395/700

FOREIGN PATENT DOCUMENTS 3-65727  3/1991  Japan .

OTHER PUBLICATIONS

Jerry Jex, "Flash Memory BIOS for PC and Notebook Comuters", Communications, Computers, and Signal Processing, IEEE 1991.

Primary Examiner—Thomas C. Lee
Assistant Examiner—D. Dinh
Attorney, Agent, or Firm—Finnegan, Henderson, Farabow, Garrett & Dunner, L.L.P.

[57] ABSTRACT

A control program for controlling an HDD and a rewrite program for rewriting the control program are stored together in a flash EEPROM. Upon entering the rewrite mode, a CPU in the HDD saves the control program in the flash EEPROM into the RAM. The CPU erases the flash EEPROM and restores the rewrite program of the RAM into the EEPROM. The CPU receives a new control program from a host computer and loads it in the flash EEPROM. The erasing of the flash EEPROM and the loading of the new control program are performed by the CPU in accordance with the rewrite program saved in the RAM.

20 Claims, 4 Drawing Sheets

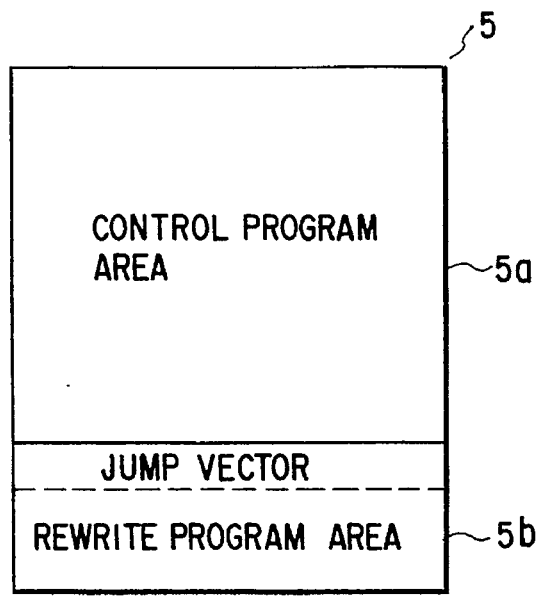
F I G. 3
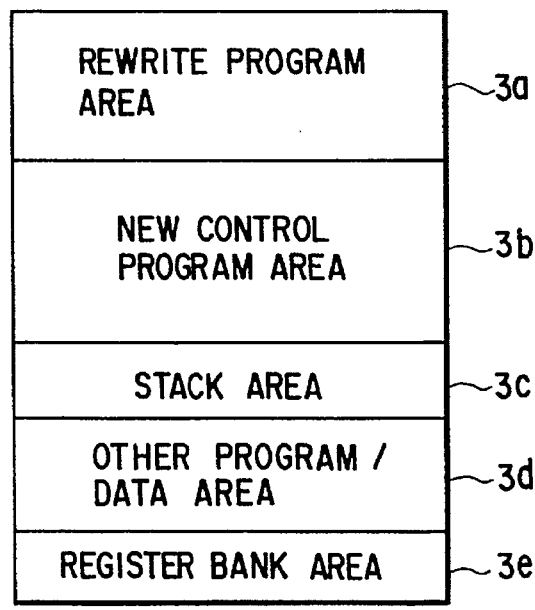
F I G. 4

5,603,056

DISK DRIVE CONTROL COMPUTER AND METHOD FOR REWRITING CONTROL PROGRAM IN FLASH EEPROM WITH SERIAL COMMUNICATION USING UNASSIGNED PINS OF SCSI OR ATA CONNECTOR

BACKGROUND OF THE INVENTION

1. Field of the Invention

The present invention relates to a control computer used in a hard disk drive, for example.

2. Description of the Related Art

Conventionally, a hard disk drive (HDD) includes a microcomputer serving as a control computer for controlling various circuits constituting the HDD such as a servo circuit, a read/write circuit of a head and a motor driver/motor controller. The control computer is a dedicated computer for executing predetermined control operations under the control of a control program.

Normally, the control program is fixedly stored in a read only memory (ROM) comprised of an IC memory. However, the control program must be changed depending on the product specification. For example, the hard disk drive must be customized depending on a customer's needs. For this reason, when the control computer is built in the HDD, the ROM is mounted on an IC socket. The use of IC socket permits the replacement of the ROM, to thereby change the control program.

However, the contact failure is apt to be caused when the ROM is inserted into the IC socket. Further, the cost is increased by the addition of the IC socket. Furthermore, a space for mounting the IC socket must be secured on the print circuit board. On the other hand, if the ROM is welded to the print circuit board without the IC socket, the ROM is not replaceable, which is impractical.

In order to solve the above problem, a method has been developed in which an electrically erasable programmable read only memory (EEPROM) is used in place of the ROM for storing the control program. The EEPROM is a nonvolatile and rewritable ROM which permits erase and rewrite operations. The EEPROMs are classified into a type in which the erase operation is performed in units of words, a type in which the erase operation is performed in units of blocks or rows, and a type in which erase operation is performed over the entire memory array, which is referred to as bulk erase. The EEPROM of bulk erase type is referred to as a flash EEPROM. Because of low cost, the flash EEPROM is used in place of the above described ROM. The use of the flash EEPROM permits the change of the control program without changing the memory itself. More specifically, the control program stored in the flash EEPROM may be replaced with a new control program supplied from a host computer, for example.

However, in order to rewrite the control program stored in the flash EEPROM, a dedicated program for rewriting the control program stored in the EEPROM to the new control program must be prepared. However, the rewrite program cannot be stored together with the control program in the flash EEPROM or in the EEPROMs other than the flash EEPROM. Because if the rewrite program is stored in the flash EEPROM together with the control program, the rewrite program will be erased when the erase operation is performed for replacing the control program with a new control program. Even if the EEPROMs other than the flash EEPROM are used, the rewrite program cannot be stored together with the control program because the rewrite program cannot be read out while writing the new control program in the same memory. For this reason, an additional ROM for storing the rewrite program is built in the HDD. However, such additional ROM for storing the rewrite program increases the cost and complicates the circuit arrangement.

SUMMARY OF THE INVENTION

An object of the present invention is to provide a control computer and a method for rewriting a control program which permit both the control program and a rewrite program to be stored in a same EEPROM and the replacement of the control program, without increasing the cost and the number of components.

According to a first aspect of the present invention, a control computer comprises: a nonvolatile and rewritable memory storing a control program for controlling a drive of a storage device and a rewrite program for rewriting the control program; a volatile memory for temporarily storing the rewrite program and an externally supplied new control program; and a central processing unit (CPU) performing the following operations of: saving the rewrite program stored in the nonvolatile and rewritable memory in the volatile memory, erasing the nonvolatile and rewritable memory, restoring the rewrite program stored in the volatile memory in the erased nonvolatile and rewritable memory, receiving the new control program supplied externally and storing in the volatile memory, loading the new control program stored in the volatile memory in the nonvolatile and rewritable memory, and executing the new control program in the nonvolatile and rewritable memory.

According to a second aspect of the present invention, a control computer comprises: a nonvolatile and rewritable memory having a control program area storing a control program for controlling a drive of a storage device and a rewrite program area storing a rewrite program for rewriting the control program; volatile memory for temporarily storing the rewrite program and an externally supplied new control program; and a central processing unit (CPU) for performing the following operations of: loading the rewrite program stored in the rewrite program area in the nonvolatile and rewritable memory into the volatile memory to thereby execute the rewrite program in the volatile memory, receiving a new control program supplied externally, erasing the control program area in the nonvolatile and rewritable memory, loading the received new control program into the erased control program area in the nonvolatile and rewritable memory and executing the new control program loaded in the control program area in the nonvolatile and rewritable memory.

According to the present invention, a control program and a rewrite program are stored together in a flash EEPROM or an EEPROM. When the control program stored in the flash EEPROM is to be replaced with a new control program supplied from a host computer, the rewrite program is first saved in the RAM. Then, the CPU executes the rewrite program in the RAM to thereby erase entire memory array of the flash EEPROM and restore the rewrite program in the erased flash EEPROM. Further, the CPU receives a new control program from a host unit and stores in the RAM. Then, the CPU loads the new control program stored in the RAM into the flash EEPROM. Thereafter, the CPU controls the hard disk drive in accordance with the new control program stored in the flash EEPROM.

According to a second aspect of the present invention, when the control program and the rewrite program are stored together in the EEPROM, the CPU loads the rewrite program in the EEPROM into the RAM to thereby execute the rewrite program. Then, the CPU receives a new control program supplied from a host computer and stores in the RAM. Further, the CPU erases only an area storing the control program in the EEPROM and loads the new control program stored in the RAM into the erased area in the EEPROM. Then, the CPU controls the hard disk drive in accordance with the new control program stored in the EEPROM.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a memory map of the flash EEPROM (or EEPROM) in FIGS. 1 and 2;

FIG. 4 is a memory map of the RAM shown in FIGS. 1 and 2;

DETAILED DESCRIPTION OF THE PREFERRED EMBODIMENTS

An embodiment of the present invention will now be described with reference to the drawings.

Figure 1:
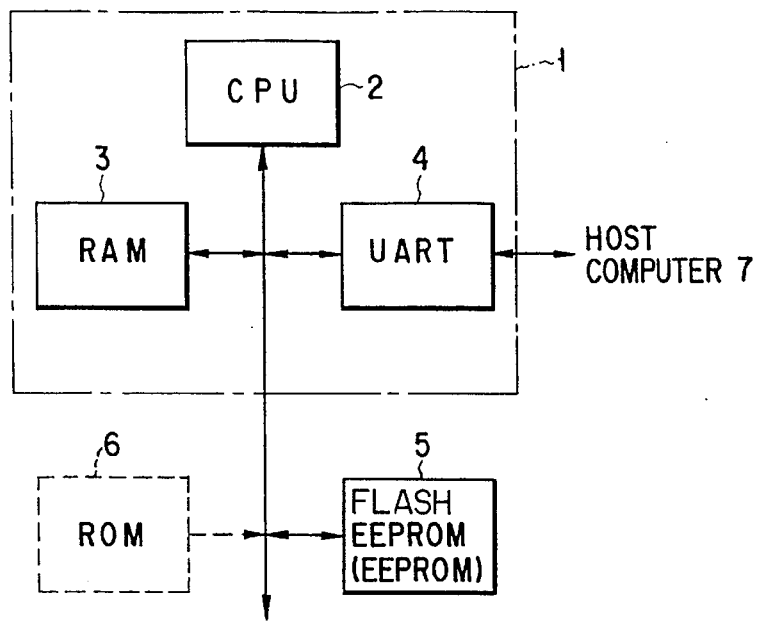
FIG. 1 is a block diagram showing a main portion of a control microcomputer according to an embodiment of the present invention.

FIG. 1 is a block diagram showing a main portion of a control computer according to the embodiment of the present invention, and more particularly to a control microcomputer for controlling a hard disk drive (HDD).

As shown in FIG. 1, the control microcomputer 1 comprises a central processing unit (CPU) 2, a random access memory (RAM) 3 in which a rewrite program is temporarily stored for rewriting a control program for controlling the HDD, an I/O interface 4, and a flash EEPROM (or EEPROM) 5 storing the control program for controlling the HDD.

Figure 2:
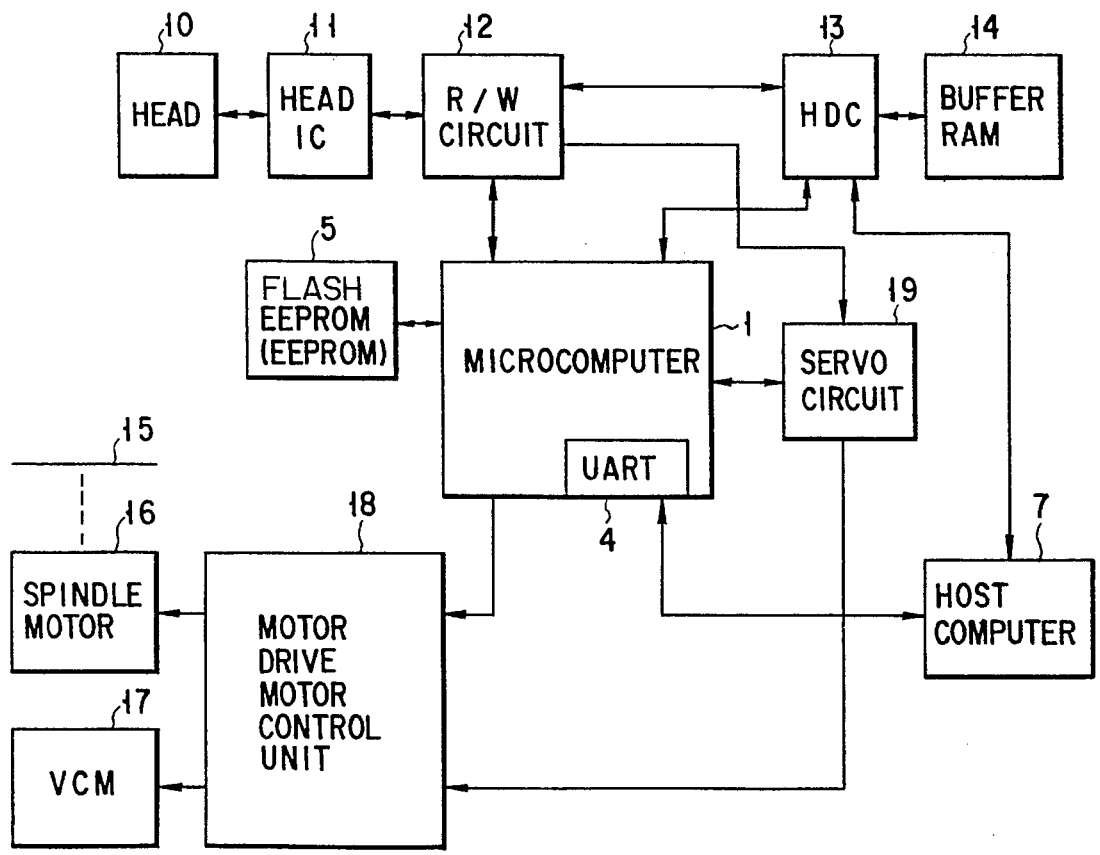
FIG. 2 is a block diagram showing a main portion of an HDD using the control microcomputer in FIG. 1.

The CPU 2 executes the control program stored in the flash EEPROM (or EEPROM) 5 to control various circuits of the HDD shown in FIG. 2. As shown in FIG. 3, the flash EEPROM (or EEPROM) 5 comprises an control program area 5a and a rewrite program area 5b. The control program area 5a has a capacity of 128K bytes for example, and stores the control program for controlling the HDD. The rewrite program area 5b has a capacity of 1K bytes for example and stores the rewrite program for rewriting the control program in the control program area 5a. The rewrite program area 5b also stores a jump vector which indicates a start address of the rewrite program. The CPU 2 has two operation modes, namely a control mode and a rewrite mode. In the control mode, the CPU 2 controls the HDD in accordance with the control program stored in the flash EEPROM (or EEPROM) 5. In the rewrite mode, the CPU 2 rewrites the control program stored in the flash EEPROM (EEPROM) 5 to a new control program supplied from a host computer in accordance with the control program temporarily stored in the RAM 3. The designation of the control mode or the rewrite mode is performed by inputting a corresponding command from the host computer. More specifically, the rewrite program comprises two parts, namely a mode switching routine and a rewrite routine. In response to a command designating the control mode, the CPU 2 jumps to an address designated by the jump vector, namely a start address of the mode switching routine. On the other hand, in response to a command designating the rewrite mode, the CPU 2 jumps directly to the start address of the rewrite routine.

As shown in FIG. 4, the RAM 3 comprises a rewrite program area 3a, a new control program area 3b, a stack area 3c, other program and data area 3d and a register bank area 3e. The rewrite program area 3a has a capacity of 1K bytes and temporarily stores the rewrite program read out from the flash EEPROM (or EEPROM) 5.

The I/O interface 4 connects the control microcomputer 1 to the host computer 7 to receive a new control program or a new rewrite program from the host computer and to permit exchange of other programs and data therebetween. More specifically, the I/O interface 4 is implemented by a universal asynchronous receiver/transmitter (UART). The I/O interface 4 is based on Small Computer Systems Interface (SCSI) or ATA (AT attachment), for example and uses unassigned two pins (one for receiving data and the other for transmitting data) of a SCSI connector or an ATA connector to perform serial transmission between the CPU 2 and the host computer 7. The stack area 3c stores various parameters such as a return address of a subroutine or temporarily stores contents of registers. The other program/data area 3d temporarily stores programs other than the control program and the rewrite program and data supplied from the host computer 7. The register bank area 3e are memory mapped registers.

FIG. 2 shows a block diagram of the HDD using the control microcomputer 1. The HDD is provided with an head 10 for reading data from or writing data into a disk serving as a recording medium 15, a spindle motor 16 for rotating the disk 15 and a voice coil motor (VCM) 17 for seeking the disk radially. The spindle motor 16 and the VCM 17 are each driven by a motor drive/motor control unit 18. The unit 18 drives the spindle motor 16 using control signals from the control microcomputer 1. Furthermore, the unit 18 drives the VCM 17 using control signals from a servo circuit 19.

The control microcomputer 1 controls a read/write (R/W) circuit 12 to supply a write signal to the head 10 through a head IC 11, and reproduces a read signal from the head 10. In response to the servo signals (a position signal and a target cylinder address) reproduced by the R/W circuit 12, the servo circuit 19 supplies a control signal to the unit 18 in order to position the head 10 in the center of the target cylinder. A hard disk controller (HDC) 13 serves as an interface between a host computer 7 and the HDD to exchange data and interface signals therebetween. The HDC 13 accesses a buffer RAM 14 for temporarily storing the read and write data. The CPU 2 controls various circuits shown in FIG. 2 in accordance with the control program stored in the control program area 5a of the EEPROM 5.

Figure 5:
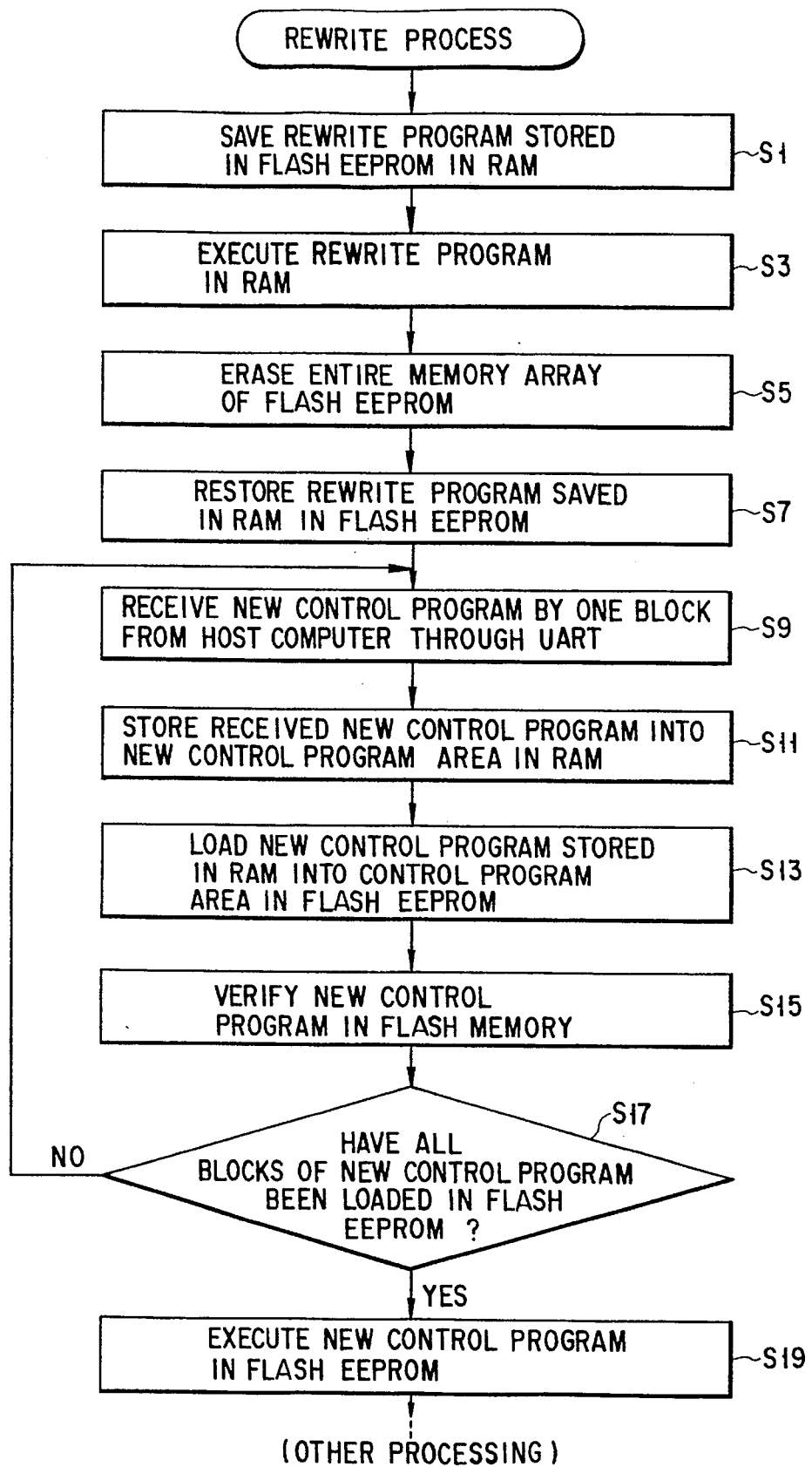
FIG. 5 is a flowchart of a rewrite operation when the flash EEPROM is used in which all the memory array are erased.
Figure 6:
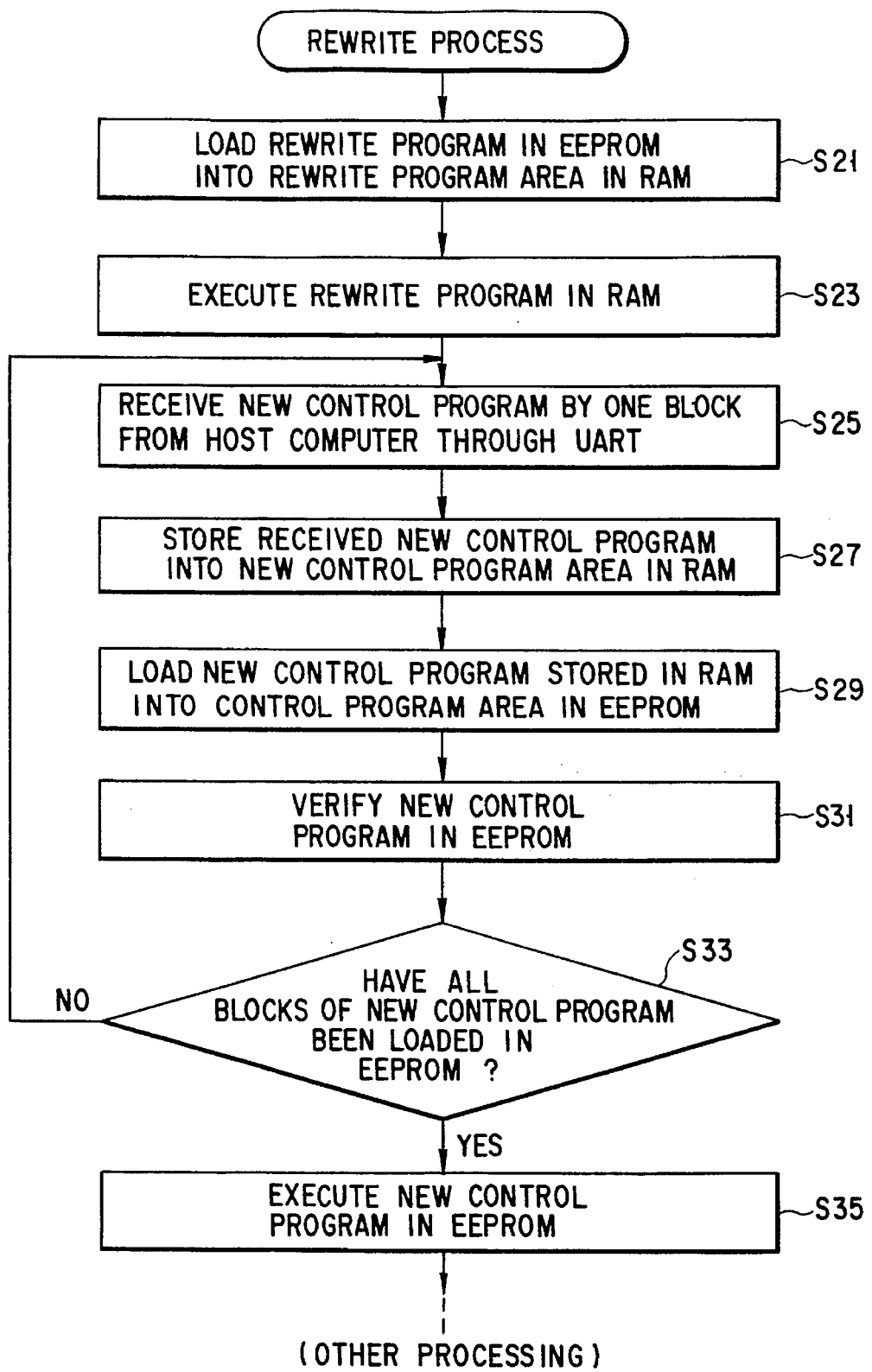
FIG. 6 is a flowchart of a rewrite operation when the EEPROM is used in which the erase operation is performed in units of blocks.

An operation of the above embodiment will now be described with reference to the flowcharts shown in FIGS. 5 and 6.

First, the rewrite operation of the control program stored in the flash EEPROM 5 will now be described with reference to the flowchart shown in FIG. 5. As described above, in the case of the flash EEPROM 5, the entire memory array of the flush EEPROM 5 is erased.

First, an operator inputs a command instructing the rewrite operation such as "LM" (Loader Mode) from the host computer 7 to set the CPU in the rewrite mode. In response to the rewrite operation command, the CPU 2 in the HDD directly jumps to the start address of the rewrite routine stored in the rewrite program area 5b in the flash EEPROM 5. Then, the CPU 2 executes the rewrite routine in the rewrite program area 5b. FIG. 5 shows the operation of the rewrite routine. In FIG. 5, the CPU 2 saves the rewrite program (the jump vector, the mode switching routine, and the rewrite routine) stored in the rewrite program area 5b in the flash EEPROM 5 into the rewrite program area 3a in the RAM 3 (step S1) so as not to be erased by the erase operation to be described later. After the rewrite program stored in the rewrite program area 5b in the flash EEPROM 5 is saved in the rewrite routine area 3a in the RAM 3, the rewrite program in the rewrite program area 5b switches a program counter (not shown) of the CPU 2 to the start address of the rewrite program saved in the rewrite program area 3a in the RAM 3. Then, the CPU 2 executes the rewrite routine saved in the RAM 3 (step S3). Then, the CPU 2 erases the entire memory array of the flash EEPROM 5 (step S5). After the flash EEPROM 5 is erased, the CPU 2 restores the rewrite program saved in the area 3a of the RAM 3 into the area 5b of the flash memory 5 (step S7). Then, the CPU 2 receives a new control program by one block (64 bytes or 128 bytes) from the host computer 7 through the UART 4 (step S9). Then, the CPU 2 stores the received one block of new control program into the new control program area 3b of the RAM 3. In step S13, the CPU 2 loads the one block of new control program stored in the area 3b of the RAM 3 into the control program area 5a of the flash EEPROM 5. Note that in this embodiment, the first block of the new control program supplied from the host computer 7 is a control block which indicates whether or not the new control program has been correctly written. In the initial state, the control block is filled with a null code. After all the blocks of the new control program have been correctly written, the CPU 2 writes, in the control block, data indicating the validity of the new control program. Then, the CPU 2 verifies whether or not the one block of new control program has been correctly written in the area 5a (step S15). In step S17, the CPU 2 checks whether or not all the blocks of new control program have been written in the area 5a. If not, the CPU 2 returns to the step S9 and repetitively executes steps S9 to S17 until all the blocks of new control program have been written in the area 5a. If it is determined that all the blocks of new control program have been written in the area 5a in step S17, the CPU 2 writes into the control block in the area 5a data indicating the validity of the new control program, and informs the completion of the rewrite operation to the host computer 7, and switches the program counter of the CPU 2 to a predetermined address of the rewrite program in the area 5b. Then, an operator inputs a command such as "MA" designating the control mode from the host computer 7. In response to this command, the CPU 2 is set in the control mode. More specifically, the CPU 2 first jumps to the jump vector in the area 5b. The jump vector indicates a start address of the mode switching routine in the area 5b. Accordingly, the CPU 2 executes the mode switching routine. The mode switching routine checks the control block in the area 5a to determine the validity of the new control program. Since the control block indicates that the new control program has been correctly written, the CPU 2 jumps to the start address of the new control program in the area 5a to thereby execute the new control program to control the HDD (step S19).

The rewrite operation of the rewrite program stored in the EEPROM 5 which permits erase operation in units of blocks will now be described with reference to the flowchart shown in FIG. 6. The process for which the CPU enters into the rewrite mode is the same as that in the case of FIG. 5 and therefore the description thereof will be omitted. In this case, the rewrite program stored in the rewrite program area 5b is not erased by the erase operation. However, the rewrite program in the area 5b cannot be read out while writing the new control program into the area 5a. Therefore, the CPU 2 loads the rewrite program in the area 5b into the rewrite program area 3a of the RAM 3 (step S21). The rewrite program in the area 5b switches a program counter of the CPU 2 to the start address of the rewrite program loaded in the area 3a. As a result, the CPU 2 executes the rewrite program loaded in the area 3a (step S23). Then, the CPU 2 receives the new control program by one block (64 bytes or 128 bytes) from the host computer 7 through the UART 4. Then, the CPU 2 stores the received one block of new control program in the area 3b of the RAM 3. Then, the CPU 2 loads the one block of new control program stored in the area 3b into the area 5b. In this case, the EEPROM 5 itself performs the erase operation by one block in a hardware manner before writing the one block of new control program (step S27). Then, the CPU 2 verifies whether or not the one block of new control program has been correctly written in the area 5a (step S31). In step S33, the CPU 2 checks whether or not all the blocks of new control program have been written in the area 5a. If not, the CPU 2 returns to step S25 and repetitively executes steps S25 to S33 until all the blocks of new control program have been written in the area 5a. If it is determined in step S33 that all the blocks of new control program have been written in the area 5a the CPU 2 writes into the control block in area 5a data indicating the validity of the new control program, and informs, the completion of the rewrite operation is informed to the host computer 7, and switches the program counter of the CPU 2 to a predetermined address of the rewrite program in the area 5b. Then, an operator inputs a command such as "MA" designating the control mode from the host computer 7. In response to this command, the CPU 2 is set in the control mode. More specifically, the CPU 2 first jumps to the jump vector in the area 5b. The jump vector indicates a start address of the mode switching routine in the area 5b. Accordingly, the CPU 2 executes the mode switching routine. The mode switching routine checks the control block in the area 5a to determine the validity of the new control program. Since control block indicates that the new control program has been correctly written, the CPU 2 jumps to the start address of the new control program in the area 5a to thereby execute the new control program to control the HDD (step S35).

As described above, the rewrite program is stored together with the control program in the flash EEPROM (or EEPROM) 5. Then, the rewrite program is saved or loaded in the RAM 3 to execute the rewrite program. Accordingly, the CPU 2 can write the new control program supplied from the host computer 7 in the flash EEPROM or the EEPROM 5 while reading the rewrite program in the RAM 3. As a result, the ROM 6 storing the rewrite program which has been built in the conventional HDD can be eliminated.

In the above embodiments, the control program stored in the flash EEPROM or the EEPROM 5 is replaced with the new control program supplied from the host computer 7. The present invention is not limited to the above embodiment. For example, the rewrite program stored in the flash EEPROM or the EEPROM may be replaced with a new rewrite program supplied from the host computer 7. The replacement of the rewrite program is performed in the same manner as the replacement of the control program and therefore, the description thereof will be omitted.

Further, in the above embodiment, the control program for controlling the HDD has been exemplified. However, the present invention can be applied to other drives of storage devices such as a floppy disk, a flexible disk, an optical disk, a magnet-optical disk, a CD-ROM, and a video disk, and also to other I/O controllers including a control CPU such as a keyboard controller, a printer controller, and a display controller.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A control computer, comprising:
    a nonvolatile and rewritable memory storing a control program for controlling a drive of a storage device and a rewrite program for rewriting the control program;
    a volatile memory for temporarily storing the rewrite program and a new control program supplied from a host computer;
    a central processing unit (CPU) performing the following operations of:
        saving the rewrite program stored in the nonvolatile and rewritable memory in the volatile memory,
        erasing the nonvolatile and rewritable memory, restoring the rewrite program stored in the volatile memory in the erased nonvolatile and rewritable memory,
        receiving the new control program supplied from the host computer and storing it in the volatile memory,
        loading the new control program stored in the volatile memory in the nonvolatile and rewritable memory, and
        executing the new control program in the nonvolatile and rewritable memory;
    an I/O interface for communicating with the host computer to receive the new control program from the host computer; and
    an SCSI connected wherein the I/O interface performs a serial communication with the host computer by using unassigned pins of the SCSI connector.

2. The control computer according to claim 1, wherein the CPU has a rewrite mode for replacing the control program stored in the nonvolatile and rewritable memory with the new control program and a control mode for controlling the drive in accordance with the control program stored in the nonvolatile and rewritable memory, and the modes are switched in response to an externally supplied command.

3. The control computer according to claim 1, wherein the drive of the storage device is a hard disk drive.

4. The control computer according to claim 1, wherein the I/O interface comprises a Universal Asynchronous Transmitter Receiver (UART).

5. A control computer, comprising:
    a nonvolatile and rewritable memory having a control program area storing a control program for controlling a drive of a storage device and a rewrite program area storing a rewrite program for rewriting the control program;
    a volatile memory for temporarily storing the rewrite program and a new control program supplied from a host computer;
    a central processing unit (CPU) for performing the following operations of:
        loading the rewrite program stored in the rewrite program area in the nonvolatile and rewritable memory into the volatile memory to thereby execute the rewrite program in the volatile memory,
        receiving a new control program supplied from the host computer,
        erasing the control program area in the non-volatile and rewritable memory,
        loading the received new control program into the erased control program area in the nonvolatile and rewritable memory, and
        executing the new control program loaded in the control program area in the nonvolatile and rewritable memory;
    an I/O interface for communicating with the host computer to receive the new control program from the host computer; and
    an SCSI connector wherein the I/O interface performs a serial communication with the host computer by using unassigned pins of the SCSI connector.

6. The control computer according to claim 5, wherein the CPU has a rewrite mode for replacing the control program stored in the nonvolatile and rewritable memory with the new control program and a control mode for controlling the drive in accordance with the control program stored in the nonvolatile and rewritable memory, and the modes are switched in response to an externally supplied command.

7. The control computer according to claim 5, wherein the drive of the storage device is a hard disk drive.

8. The control computer according to claim 5, wherein the I/O interface comprises a Universal Asynchronous Transmitter Receiver (UART).

9. A control computer, comprising:
    a nonvolatile and rewritable memory storing a control program for controlling a drive of a storage device and a rewrite program for rewriting the control program;
    a volatile memory for temporarily storing the rewrite program and a new rewrite program supplied from a host computer;
    a central processing unit (CPU) performing the following operations of:
        saving the rewrite program stored in the non-volatile and rewritable memory in the volatile memory,
        erasing the nonvolatile and rewritable memory,
        receiving the new rewrite program supplied from the host computer and storing it in the volatile memory,
        loading the new rewrite program stored in the volatile memory in the nonvolatile and rewritable memory, and executing the new rewrite program in the nonvolatile and rewritable memory;

an I/O interface for communicating with the host computer to receive the new control program from the host computer; and an SCSI connector wherein the interface performs a serial communication with the host computer by using unassigned pins of the SCSI connector.

10. The control computer according to claim 9, wherein the I/O interface comprises a Universal Asynchronous Transmitter Receiver (UART).

11. In a control computer for controlling a drive unit of a storage device and provided with a CPU, an EEPROM storing the control program and a rewrite program for rewriting the control program, a RAM for temporarily storing the rewrite program, and an I/O interface for communicating with a host computer, a method for rewriting the control program comprising the computer steps of:

transferring, by the CPU, the rewrite program of the EEPROM into the RAM;

erasing the EEPROM, by the CPU, under the control of the rewrite program in the RAM;

loading the rewrite program in the RAM into the EEPROM;

receiving, by the CPU under the control of the rewrite program in the RAM, a new control program supplied from the host computer through an I/O interface through which the CPU serially communicates with the host computer using unassigned pins of an SCSI connector to receive the new control program from the host computer;

temporarily storing, by the CPU under the control of the rewrite program in the RAM, the received new control program in the RAM;

loading, by the CPU under the control of the rewrite program in the RAM, the received new control program into the EEPROM; and switching the execution of the CPU to the new control program loaded in the EEPROM in accordance with the rewrite program in the RAM.

12. The method of claim 11, wherein the receiving step includes step of providing the I/O interface to include a Universal Asynchronous Transmitter Receiver (UART).

13. A control computer, comprising:

a nonvolatile and rewritable memory storing a control program for controlling a drive of a storage device and a rewrite program for rewriting the control program;

a volatile memory for temporarily storing the rewrite program and a new control program supplied from a host computer;

a central processing unit (CPU) performing the following operations of:

saving the rewrite program stored in the nonvolatile and rewritable memory in the volatile memory, erasing the nonvolatile and rewritable memory, restoring the rewrite program stored in the volatile memory in the erased nonvolatile and rewritable memory, receiving the new control program supplied from the host computer and storing it in the volatile memory, loading the new control program stored in the volatile memory in the nonvolatile and rewritable memory, and executing the new control program in the nonvolatile and rewritable memory;

an I/O interface for communicating with the host computer to receive the new control program from the host computer; and an ATA connector wherein the I/O interface performs a serial communication with the host computer by using unassigned pins of the ATA connector.

14. The control computer according to claim 13, wherein the I/O interface comprises a Universal Asynchronous Transmitter Receiver (UART).

15. A control computer, comprising:

a nonvolatile and rewritable memory having a control program area storing a control program for controlling a drive of a storage device and a rewrite program area storing a rewrite program for rewriting the control program;

a volatile memory for temporarily storing the rewrite program and a new control program supplied from a host computer;

a central processing unit (CPU) for performing the following operations of:

loading the rewrite program stored in the rewrite program area in the nonvolatile and rewritable memory into the volatile memory to thereby execute the rewrite program in the volatile memory, receiving a new control program supplied from the host computer, erasing the control program area in the non-volatile and rewritable memory, loading the received new control program into the erased control program area in the nonvolatile and rewritable memory, and executing the new control program loaded in the control program area in the nonvolatile and rewritable memory;

an I/O interface for communicating with the host computer to receive the new control program from the host computer; and an ATA connector wherein the I/O interface performs a serial communication with the host computer by using unassigned pins of the ATA connector.

16. The control computer according to claim 15, wherein the I/O interface comprises a Universal Asynchronous Transmitter Receiver (UART).

17. A control computer, comprising:

a nonvolatile and rewritable memory storing a control program for controlling a drive of a storage device and a rewrite program for rewriting the control program;

a volatile memory for temporarily storing the rewrite program and an externally supplied new control program;

a central processing unit (CPU) performing the following operations of:

saving the rewrite program stored in the nonvolatile and rewritable memory in the volatile memory, erasing the nonvolatile and rewritable memory, restoring the rewrite program stored in the volatile memory in the erased nonvolatile and rewritable memory, receiving the new control program supplied externally and storing it in the volatile memory, loading the new control program stored in the volatile memory in the nonvolatile and rewritable memory, executing the new control program in the nonvolatile and rewritable memory;

a SCSI connector; and an I/O interface for communicating with a host computer to receive the new control program from the host computer, the I/O interface comprising a Universal Asynchronous Transmitter Receiver (UART) and performing a serial communication with the host computer by using unassigned pins of the SCSI connector.

18. A control computer, comprising:

a nonvolatile and rewritable memory storing a control program for controlling a drive of a storage device and a rewrite program for rewriting the control program;

a volatile memory for temporarily storing the rewrite program and an externally supplied new control program;

a central processing unit (CPU) performing the following operations of:
  saving the rewrite program stored in the nonvolatile and rewritable memory in the volatile memory,
  erasing the nonvolatile and rewritable memory, restoring the rewrite program stored in the volatile memory in the erased nonvolatile and rewritable memory, receiving the new control program supplied externally and storing it in the volatile memory,
  loading the new control program stored in the volatile memory in the nonvolatile and rewritable memory,
  executing the new control program in the nonvolatile and rewritable memory;

an ATA connector; and an I/O interface for communicating with a host computer to receive the new control program from the host computer, the I/O interface comprising a Universal Asynchronous Transmitter Receiver (UART) and performing a serial communication with the host computer by using unassigned pins of the ATA connector.

19. A control computer, comprising:

a nonvolatile and rewritable memory having a control program area storing a control program for controlling a drive of a storage device and a rewrite program area storing a rewrite program for rewriting the control program;

a volatile memory for temporarily storing the rewrite program and an externally supplied new control program;

a central processing unit (CPU) for performing the following operations of:
  loading the rewrite program stored in the rewrite program area in the nonvolatile and rewritable memory into the volatile memory to thereby execute the rewrite program in the volatile memory,
  receiving a new control program externally supplied,
  erasing the control program area in the nonvolatile and rewritable memory,
  loading the received new control program into the erased control program area in the nonvolatile and rewritable memory, and
  executing the new control program loaded in the control program area in the nonvolatile and rewritable memory;

a SCSI connector; and an I/O interface communicating with a host computer to receive the new control program from the host computer, the I/O interface comprising a Universal Asynchronous Transmitter Receiver (UART) and performing a serial-communication with the host computer by using unassigned pins of the SCSI connector.

20. A control computer, comprising:

a nonvolatile and rewritable memory having a control program area storing a control program for controlling a drive of a storage device and a rewrite program area storing a rewrite program for rewriting the control program;

a volatile memory for temporarily storing the rewrite program and an externally supplied new control program;

a central processing unit (CPU) for performing the following operations of:
  loading the rewrite program stored in the rewrite program area in the nonvolatile and rewritable memory into the volatile memory to thereby execute the rewrite program in the volatile memory,
  receiving a new control program externally supplied,
  erasing the control program area in the nonvolatile and rewritable memory,
  loading the received new control program into the erased control program area in the nonvolatile and rewritable memory, and
  executing the new control program loaded in the control program area in the nonvolatile and rewritable memory;

an ATA connector; and an I/O interface communicating with a host computer to receive the new control program from the host computer, the I/O interface comprising a Universal Asynchronous Transmitter Receiver (UART) and performing a serial-communication with the host computer by using unassigned pins of the ATA connector.

* * * * *

UNITED STATES PATENT AND TRADEMARK OFFICE
CERTIFICATE OF CORRECTION

PATENT NO. : 5,603,056
DATED : February 11, 1997
INVENTOR(S) : Tokuyuki TOTANI

It is certified that error appears in the above-indentified patent and that said Letters Patent is hereby corrected as shown below:

Claim 1, column 7, line 60, "connected" should read --connector--.

Claim 9, column 9, line 6, before "interface", insert --I/O--.

Signed and Sealed this

Twenty-sixth Day of August, 1997

Attest:

BRUCE LEHMAN

Attesting Officer

Commissioner of Patents and Trademarks